June 26, 1962  F. S. MARTIN ET AL  3,041,220
LAMINATED BOAT CONSTRUCTION
Filed Oct. 9, 1959
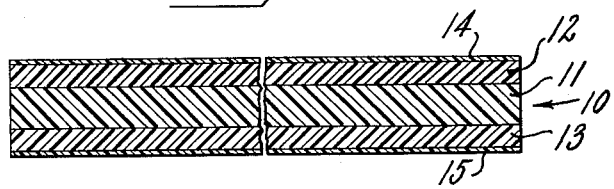
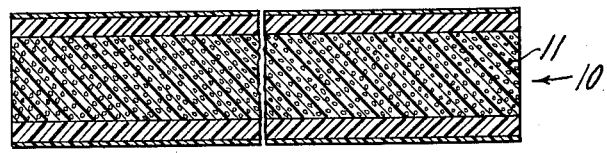
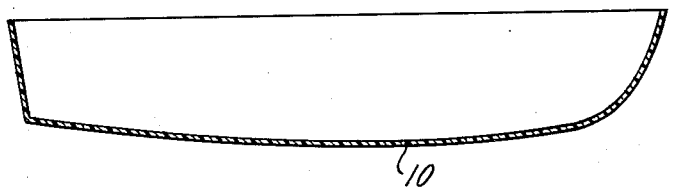
INVENTORS
FRANK S. MARTIN
ROBERT C. KOHRN
GILBERT HICKS, Jr.
BY
James J. Long
AGENT United States Patent Office 3,041,220
Patented June 26, 1962

3,041,220
LAMINATED BOAT CONSTRUCTION
Frank S. Martin and Robert C. Kohrn, Cranston, and Gilbert Hicks, Jr., Westerly, R.I., assignors to United States Rubber Company, New York, N.Y., a corporation of New Jersey
Filed Oct. 9, 1959, Ser. No. 845,511
5 Claims. (Cl. 154—45.9)

This invention relates to a composition of rubbery and resinous materials and more particularly it relates to such a composition embodied in a formed laminated structure, especially in the form of a boat.

Co-pending application Serial No. 722,814 of Robert C. Kohrn et al., filed March 20, 1958, discloses a boat of laminated construction, comprising a core member which is a closed-cell expanded blend of a major proportion of a thermoplastic resinous material and a minor proportion of a rubbery material, each face of said core member being covered by a solid, impervious sheet which is also a blend of resinous material and rubbery material. It has been desired to improve upon such construction by providing an improved over-lying weather-resistant skin or outer layer which would be especially resistant to weathering and to ozone attack in the formed or stressed state. It has further been desired to provide a laminated boat construction having a protective surface skin which would retain its smoothness on outdoor aging. Still further, it has been desired to provide such a skin having improved ability to be formed, so that desired deeper draws could be used in forming the boat by drawing methods.

The principal object of the invention is to provide an improved composition for the outer skin of the described laminated boat structure, so as to provide weather-resistance, ozone-resistance, retention of surface smoothness, and improved ability to form.

The invention will be described in detail with reference to the accompanying drawing, wherein:

FIG. 1 is a sectional view of a laminate of the invention in the unblown state;

FIG. 2 is a similar view of the laminate in the blown or expanded state; and,

FIG. 3 is a similar view, on a smaller scale, of a boat hull formed from the laminate.

The invention is based upon the surprising discovery that a vastly improved skin formulation for the purpose recited is obtained by uniformly blending chlorosulfonated polyethylene elastomer with a thermoplastic resin. The chlorosulfonated polyethylene elastomer is compounded for vulcanization, while the thermoplastic resin, by its very nature, of course remains uncured. This unique combination in the boat skin has been found to provide a number of unexpected advantages (remarkable resistance to weathering, ability to be formed without tearing, peeling or separating from the underlying material during deep drawing operations) as will appear in more detail below. Typically the composition contains from 30 to 80% (all proportions are expressed herein by weight) of the chlorosulfonated polyethylene elastomer and correspondingly from 70 to 20% of the thermoplastic resin, based on the combined weight of the chlorosulfonated polyethylene elastomer plus the thermoplastic resin as 100%. The thermoplastic resins that have been found particularly suitable for this purpose are the resinous copolymers of styrene and acrylonitrile (containing, for example, 50 to 90% styrene and correspondingly 50 to 10% acrylonitrile). Vinyl chloride resins, notably polyvinyl chloride or equivalent copolymers of vinyl chloride with a minor amount (e.g., 3–20%) of a copolymerizable monomer such as vinyl acetate represent preferred thermoplastic resins, especially in admixture with styrene-acrylonitrile resin. Particularly preferred, as the thermoplastic component of the skin formulation is a mixture of styrene-acrylonitrile resin and vinyl chloride resin; in such resin mixture the styrene-acrylonitrile resin preferably forms the major resin while the vinyl chloride resin forms the minor resin; more preferably the ratio of styrene-acrylonitrile resin to polyvinyl chloride is about 3:1. In practice we have found it to be advantageous to include, in the described chlorosulfonated polyethylene-thermoplastic resin blend, a relatively small amount (0% to 15%) of a compatible elastomer such as butadiene-acrylonitrile elastomer which appears to exert a highly beneficial plasticizing action on the resins, rendering the blend more processible and flexible. For this purpose, we preferably use about 5 to 15% of butadiene-acrylonitrile copolymer (usually containing 50–85% butadiene and correspondingly 50–15% acrylonitrile) based on the combined weights of the chlorosulfonated polyethylene, thermoplastic resins, and butadiene-acrylonitrile elastomer. The composition suitably contains in addition the usual stabilizers for the vinyl resin, as well as suitable desired pigments, along with vulcanizing agents for the rubbery constituents, in suitable small amounts.

The chlorosulfonated polyethylene elastomer which is one of the essential components of the skin formulation of the invention is a conventional, commercially available elastomer, marketed by the du Pont Company under the trade name "Hypalon." A typical commercial "Hypalon" is estimated to have a molecular weight of 30,000 and to contain approximately 28% chlorine and 1.5% sulphur. These two elements are chemically combined with a hydrocarbon chain, with most of the chlorine substituted on the chain and the sulphur is combined with chlorine and attached to the chain as sulfonyl chloride ($SO_2Cl$) groups. There is approximately one chlorine item for every six or seven carbon items, and one sulfonyl chloride for every 90 to 130 carbon items.

The preferred skin formulation of the invention comprises about 54 parts of chlorosulfonated polyethylene elastomer and about 35 parts of thermoplastic resin (made up of a mixture of about 27 parts of styrene-acrylonitrile resin and about 8 parts of polyvinyl chloride resin), to which a small amount (about 11 parts) of butadiene-acrylonitrile rubber has been added as a plasticizer.

For purposes of the invention, the described ingredients are uniformly mixed or blended in the conventional manner with the aid of the usual rubber or plastic mixing machinery, along with the other desired compounding ingredients, and the composition is formed into a thin sheet on a calender or similar device. The resulting thin film is used as the outer layer or skin of the boat hull laminate. Such a laminate is illustrated in FIG. 1 of the accompanying drawing, which shows a lay-up or laminate 10 comprising an inner core 11 of the curable or vulcanizable plastic material, preferably a mixture of a major proportion of a hard, plastic material (such as styrene-acrylonitrile resin, with or without polyvinyl chloride resin) and a minor proportion of a rubbery material compatible therewith (such as butadiene-acrylonitrile rubber, with or without small amounts of other rubbery materials, such as polybutadiene, butadiene-styrene rubber or natural rubber). The core 11 contains curatives or vulcanizing agents, such as sulphur, preferably along with an accelerator, which act on the rubbery constituent of the core and cause it to be converted by heat into a strong, solvent-resistant substance. The core composition further includes a blowing agent, that is, a substance capable of turning into a gas or vapor, or generating a gas or vapor at elevated temperature, thus forming a large number of small pores or cells in the body of the core, so that the effective density of the core is very much reduced, and the core is thus rendered extremely buoyant. The preferred density for the core, in the blown state is about 15 pounds per cubic foot, or 10–30 pounds per cubic foot. Any suitable blowing agent may be used. Particularly preferred gum plastic blends are those based on a minor proportion (e.g., 10 to 49 parts) of a rubber such as butadiene-acrylonitrile copolymer rubber and a major proportion (e.g., 90 to 51 parts) of a resin such as styrene-acrylonitrile resin or mixtures of styrene-acrylonitrile resin with a vinyl chloride resin, such as polyvinyl chloride or the like (in a ratio of, for example, 10 parts of styrene-acrylonitrile resin to 1 to 10 parts of polyvinyl chloride). A specific example of a suitable formulation for the core is as follows:

CORE

| | Parts |
|---|---|
| Styrene-acrylonitrile resin | 70 |
| Butadiene-acrylonitrile rubber | 25 |
| Plasticizer | 5 |
| Anti-oxidant | 3.1 |
| Stearic acid | 1 |
| Zinc oxide | 3 |
| Benzothiazyl disufide | 0.5 |
| Sulphur | 1.6 |
| Blowing agent | 15 |

Any suitable conventional plasticizer (such as the liquid butadiene-acrylonitrile copolymer sold under the trade name "Hycar 1312") may be used, as may any suitable conventional anti-oxidant (such as the diphenylamine-acetone condensation product known as "BLE"). Any suitable conventional blowing agent (such as dinitroso pentamethylene tetramine) may be used. For a small boat, the thickness of the core sheet might typically be about 0.1 inch (before expansion).

On each side of the core 11 are substrate layers 12, 13 that are usually less thick (they might, for example, have a thickness of about 0.05 inch for a small boat) than the core. The substrate layers may be fabricated from essentially the same ingredients as the core (except that no blowing agent is included) and their function is to provide protection and strength for the core. An example of a suitable formulation is as follows:

SUBSTRATE

| | Parts |
|---|---|
| Styrene-acrylonitrile resin | 59.6 |
| Butadiene-acrylonitrile rubber | 21.3 |
| Plasticizer (as for the core, above) | 4.2 |
| Anti-oxidant (as for the core, above) | 2.6 |
| Stearic acid | 0.8 |
| Zinc oxide | 2.5 |
| Benzothiazyl disulfide | 0.4 |
| Sulphur | 1.15 |
| Polyvinyl chloride | 15 |
| Plasticizer for polyvinyl chloride (e.g., dioctyl phthalate) | 1.8 |
| Calcium stearate | 0.15 |
| Stabilizer for polyvinyl chloride (e.g., cadmium stearate) | 0.5 |
| Colored pigments as desired. | |

To the outer side of each substrate layer there are applied skin layers 14, 15 having a thickness of for example, 0.020 inch, composed of the presently described flexible, adherent material that is highly resistant to ultraviolet light, oxidation, abrasion, ozone and weathering.

A specific example of a suitable skin formulation in accordance with the present invention is as follows:

SKIN

| | Parts |
|---|---|
| Chlorosulfonated polyethylene ("Hypalon–20") | 54 |
| Styrene-acrylonitrile copolymer resin (76% styrene) | 27 |
| Polyvinyl chloride resin ("Marvinol VR–25") | 8 |
| Butadiene-acrylonitrile rubber (32% acrylonitrile) | 11 |
| Plasticizer [1] | 3.2 |
| Stabilizer [2] | 0.3 |
| Polyethylene | 1 |
| Hydrogenated wood rosin ("Staybelite") | 1.6 |
| Magnesium oxide | 5.4 |
| Accelerator [3] | 0.27 |
| Sulphur | 0.4 |
| Pigment [4] | 22.0 |

[1] E.g., dioctyl phthalate.
[2] E.g., cadmium stearate.
[3] E.g., dipentamethylene thiuram tetrasulfide.
[4] E.g., rutile titanium dioxide.

Usually the vinyl resin, plasticizer and stabilizer are first mixed together. The styrene-acrylonitrile resin, butadiene-acrylonitrile rubber and hydrogenated wood rosin are then added to the mix in an internal mixer, following which the chlorosulfonated polyethylene and other ingredients are incorporated on a roll mill.

The polyethylene (optional) controls the calender release properties of the mix. The hydrogenated wood rosin has a curing action on the chlorosulfonated polyethylene elastomer during the process. The magnesium oxide serves not only as a pigment, but also serves to help vulcanize the chlorosulfonated polyethylene.

As is disclosed in more detail in co-pending application Serial No. 722,814 referred to above, the laminate is subjected to heat and pressure to cause adhesion of the various layers to each other, thereby forming an integral laminate. The heating is carried out for a time and temperature sufficient to bond together the plies and to cure the rubbery constituents of the laminate substantially completely, and sufficient to decompose the blowing agent in the core. With the particular compositions exemplified above, heating at a temperature of about 300° F. for a period of about thirty minutes at a pressure of about 65 p.s.i. gives satisfactory results, although other suitable temperatures, pressures and times may of course be used as will be understood by those skilled in the rubber and plastics arts.

Upon release of the applied pressure, the gas generated by the blowing agent expands the core of the laminate to much more than its original thickness, as shown in FIG. 2. In the composition illustrated, proper expansion is obtained when the curing agent (sulphur) amounts to from about 0.25 to about 1.5 parts, per 100 parts of rubber plus resin in the core.

The thus-expanded laminate is thereafter drawn or vacuum-formed, as described in more detail in copending application Serial No. 722,814 previously referred to, into the shape of a boat hull, as illustrated in FIG. 3.

One of the most important advantages of the present invention is that the skin formulation of the present laminate allows deeper drawing of the laminate than would otherwise be possible. The improved skin has greatly reduced tendency to tear, peel, or separate from the underlying materials during deep drawing operations.

Because of the described improved skin formulation, the present laminate exhibits unusual resistance to ozone attack in the formed (stressed) state. Boat hulls made of the laminate having the described skin formulation can, therefore, withstand many years of use, in which the surface is exposed to the sun and the atmosphere and to water, without developing any undesirable surface cracking.

The surface of the improved laminated boat hull remains smooth, even after prolonged exposure to the weather.

Having thus described our invention, what we claim and desire to protect by Letters Patent is:

1. A rigid, self-buoyant, heat-formable structural material suitable for the formation of boats comprising a core sheet of rigid cellular gum plastic material which is a blend of from 51 to 90 parts by weight of styrene-acrylonitrile resin and correspondingly from 49 to 10 parts by weight of butadiene-acrylonitrile rubber, a rigid sheet of solid gum plastic material of the said composition integrally united to each face of said core sheet, and an outer protective skin of flexible, adherent material that is resistant to ozone and ultra-violet light overlying the outer surface of each of said rigid sheets, said skin being a composition comprising 30–80% of chlorosulfonated polythylene elastomer and correspondingly 70—20% of thermoplastic resinous material, the said percentages being by weight and being based on the sum of the weights of the said elastomer and resinous material, the said resinous material being a blend of styrene-acrylonitrile resin and polyvinyl chloride resin in weight ratio of 3:1.

2. A rigid, self-buoyant, heat-formable structural material suitable for the formation of boats as in claim 1, in which said outer protective skin composition further contains butadiene-acrylonitrile copolymer rubber in amount of from 5 to 15% by weight of the total skin composition.

3. A rigid, self-buoyant, heat-formable structural material suitable for the formation of boats comprising a core sheet of rigid cellular gum plastic material which is a blend of from 51 to 90 parts by weight of styrene-acrylonitrile resin and corresponding from 49 to 10 parts by weight of butadiene-acrylonitrile rubber, a rigid sheet of solid gum plastic material of the said composition integrally united to each face of said core sheet, and an outer protective skin of flexible, adherent material that is resistant to ozone and ultra-violet light overlying the outer surface of each of said rigid sheets, said skin being a composition comprising 54 parts of chlorosulfonated polyethylene elastomer, 27 parts of styrene-acrylonitrile resin, 8 parts of polyvinyl chloride and 11 parts of butadiene-acrylonitrile rubber, the said parts being expressed by weight.

4. A boat hull comprising a laminate comprising a core sheet of rigid cellular gum plastic material which is a blend of from 51 to 90 parts by weight of styrene-acrylonitrile resin and correspondingly from 49 to 10 parts by weight of butadiene-acrylonitrile rubber, a rigid sheet of solid gum plastic material of the said composition integrally united to each face of said core sheet, and an outer protective skin of flexible, adherent material that is resistant to ozone and ultra-violet light overlying the outer surface of each of said rigid sheets, said skin being a composition comprising 30–80% of chlorosulfonated polyethylene elastomer and correspondingly 70–20% of thermoplastic resinous material, the said percentages being by weight and being based on the sum of the weights of the said elastomer and resinous material, the said resinous material being a blend of styrene-acrylonitrile resin and polyvinyl chloride resin in weight ratio of 3:1, and butadiene-acrylonitrile copolymer rubber in amount of from 5 to 15% by weight of the total composition.

5. A boat hull comprising a laminate comprising a core sheet of rigid cellular gum plastic material which is a blend of from 51 to 90 parts by weight of styrene-acrylonitrile resin and correspondingly from 41 to 10 parts by weight of butadiene-acrylonitrile rubber, a rigid sheet of solid gum plastic material of the said composition integrally united to each face of said core sheet, and an outer protective skin of flexible, adherent material that is resistant to ozone and ultra-violet light overlying the outer surface of each of said rigid sheets, skin being a composition comprising 54 parts of chlorosulfonated polyethylene elastomer, 27 parts of styrene-acrylonitrile resin, 8 parts of polyvinyl chloride and 11 parts of butadiene-acrylonitrile rubber, the said parts being expressed by weight.

References Cited in the file of this patent

UNITED STATES PATENTS

| | | |
|---|---|---|
| 2,630,398 | Brooks | Mar. 3, 1953 |
| 2,683,103 | Snook et al. | July 6, 1954 |
| 2,729,608 | Strain | Jan. 3, 1956 |
| 2,802,809 | Hayes | Aug. 13, 1957 |
| 2,807,603 | Parks et al. | Sept. 24, 1957 |

FOREIGN PATENTS

| | | |
|---|---|---|
| 527,626 | Canada | July 10, 1956 |
| 567,360 | Canada | Dec. 9, 1958 |